Figure 1:
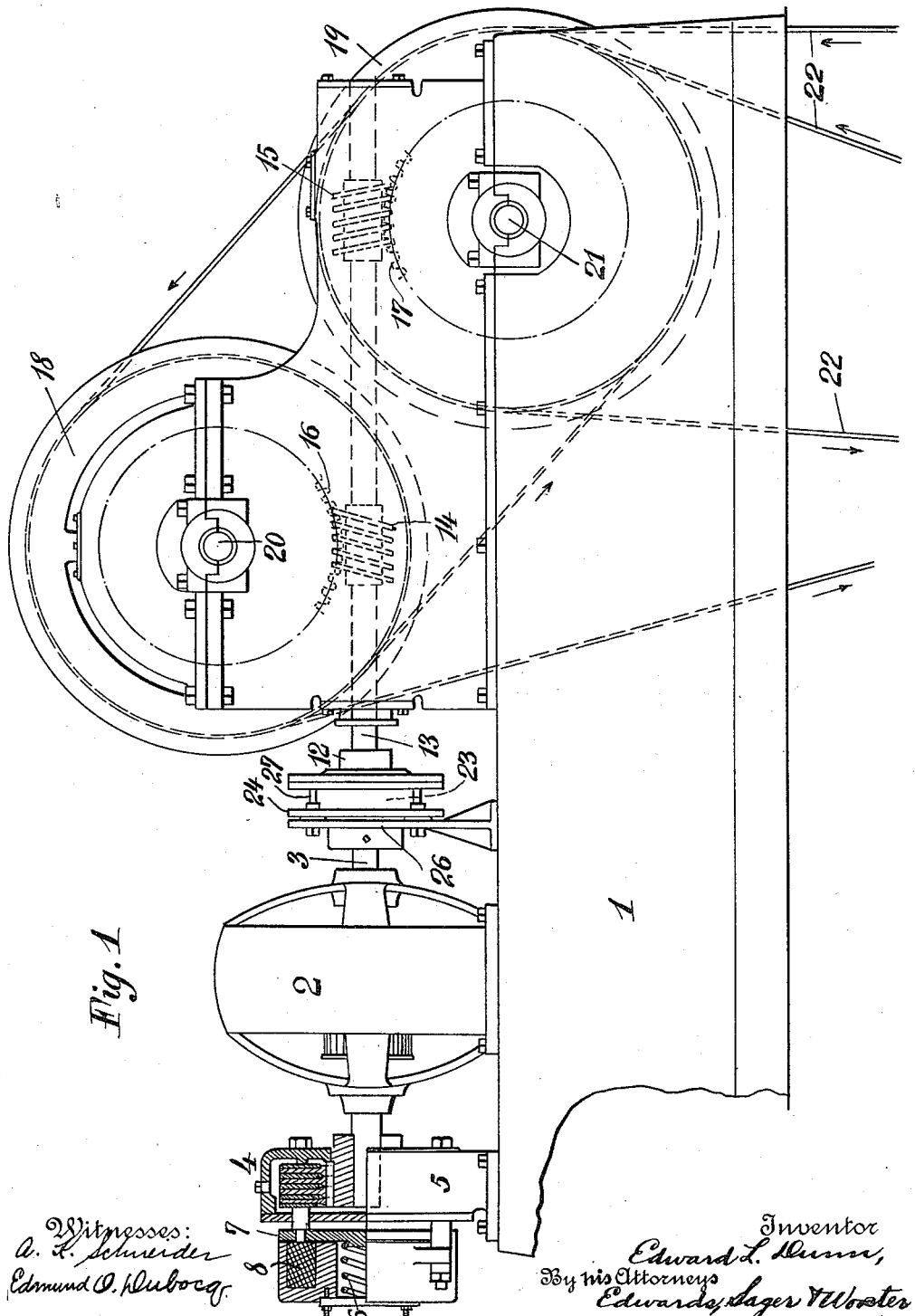

E. L. DUNN.
ELEVATOR DRIVING GEARING.
APPLICATION FILED NOV. 17, 1909.

1,150,424.

Patented Aug. 17, 1915.
2 SHEETS—SHEET 1.

Witnesses:
A. L. Schneider
Edmund O. Dubocq

Inventor
Edward L. Dunn,
By his Attorneys
Edwards, Sager & Wooster

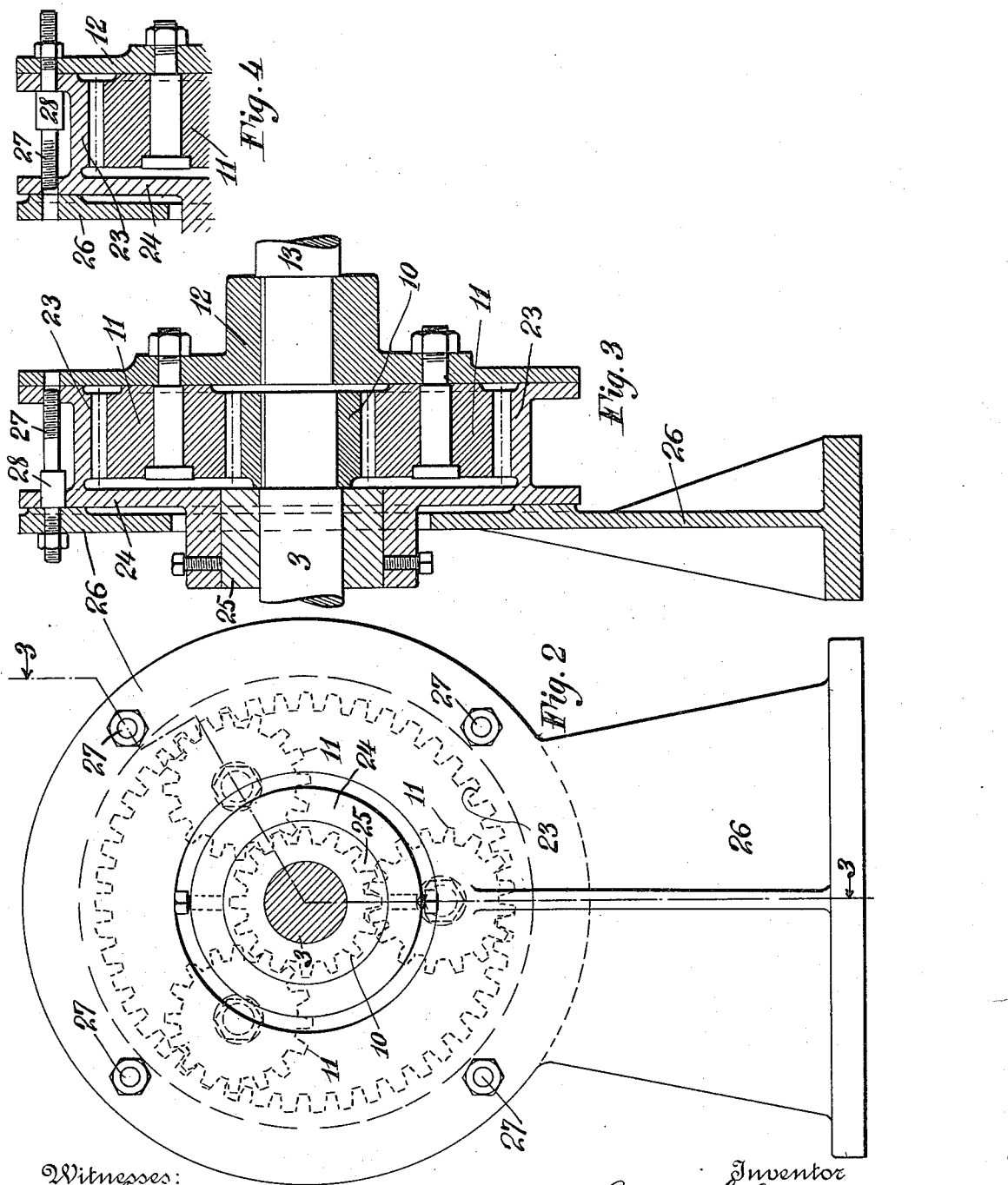

UNITED STATES PATENT OFFICE.

EDWARD L. DUNN, OF WORCESTER, MASSACHUSETTS, ASSIGNOR, BY MESNE ASSIGNMENTS, TO STANDARD PLUNGER ELEVATOR COMPANY, OF WORCESTER, MASSACHUSETTS, A CORPORATION OF MASSACHUSETTS.

ELEVATOR DRIVING-GEARING.

1,150,424.  Specification of Letters Patent. Patented Aug. 17, 1915.

Application filed November 17, 1909. Serial No. 528,482.

*To all whom it may concern:*

Be it known that I, EDWARD L. DUNN, a citizen of the United States, residing at Worcester, in the county of Worcester and State of Massachusetts, have invented certain new and useful Improvements in Elevator Driving-Gearing, of which the following is a full, clear, and exact specification.

This invention relates to elevators, and more particularly has reference to driving mechanism for gear driven machines whereby reduction gears may be used between the motor or driving means and the winding drums, as in cases where it is desired to temporarily increase the power of the machine for the purpose of moving unusual loads.

In electric elevators especially, where the machine is driven by an electric motor, and a brake operating on the shaft is used for holding it stationary when the motor is not energized, considerable danger has heretofore arisen where it has been sought to use reduction gears to hoist heavy loads by reason of the fact that in changing the connection from the ordinary direct connection to the reduction gears, the brake portion of the shaft has been disconnected from the driving or worm shaft which drives the winding drum or drums, thereby rendering the brake ineffective to hold the machine when the current is off. In worm driven machines, for instance, where the pitch of the worms is high, the worm shaft may be driven backward by a winding drum and the load, with nothing to hold it when the brake portion of the shaft is disconnected.

It is the object of this invention to provide reduction gears whereby the brake will at all times be connected to the driving shaft, irrespective of the gear ratio between the motor and the driving shaft.

According to the specific embodiment of the invention illustrated herein, I have provided in combination with a worm driven winding machine directly connected to a motor, and a brake acting on the driving shaft, reduction gears between the motor shaft and the driving shaft, so connected and operated that by shifting one or more studs from one part of the gears to another, the speed ratio between the motor shaft and the driving shaft will be varied, and more particularly reduced, whereby to enable heavy loads to be moved without endangering the safety of the apparatus or permitting the brake to become ineffective to hold the winding drum.

The invention will be more fully understood in connection with the description of the embodiment thereof shown in the accompanying drawings, wherein—

Figure 1 is a view in elevation of a winding machine embodying the invention; Fig. 2 is a section showing a form of planetary variable speed gears; Fig. 3 is a section on the line 3—3 of Fig. 2, showing the parts in position for reducing the gear ratio; and Fig. 4 shows the parts in normal position for securing a 1 to 1 ratio between the motor shaft and the driven shaft.

1 represents a base upon which is mounted a motor 2, having a motor shaft 3 at one end of which is a brake mechanism 4, consisting of a series of non-rotatable disks carried by a casing 5, alternating with a series of rotatable disks carried by the shaft 3, and normally pressed together by a spring, as 6, acting on an armature 7, which is controlled by a solenoid winding 8 in the motor circuit. When the motor circuit is closed the magnet 8 upon becoming energized withdraws the armature 7 and compresses the spring 6, thereby releasing the brake.

Referring to Fig. 3, keyed to the end of the motor shaft 3 is a pinion 10 which meshes with planet pinions 11, 11, 11, carried by a coupling 12, keyed to the end of the driving shaft 13. This shaft 13 as herein specifically shown carries opposite worms 14, 15, respectively meshing with gears 16, 17, which gears drive respectively winding drums 18, 19 on shafts 20, 21, having supporting bearings on the base 1. It will be understood, however, that the invention is not limited to this particular arrangement of winding drums or ropes, as one or more winding drums may be used according to the particular design of machine. The arrangement herein shown is a balanced system, wherein the rope 22 passes around a deflecting drum (not shown), together with the two winding drums 18, 19, one end of the rope carrying the car and the other a counter-weight, and embodied in a machine of the traction type wherein the motor and the winding drums are mounted at the top of the hatchway.

Meshing with the planet pinions 11, is an internal gear 23, carried by a plate 24 which is mounted on a bearing sleeve 25 to rotate on the shaft 3. At one end of the internal gear 23 is the coupling 12, heretofore described as keyed to the shaft 13, and at the other side is a stationary standard 26 adapted to be bolted to the base 1, and having a hole through which passes the hub of the plate 24. Mounted in the gear body 23 are one or more studs 27 provided with shoulders 28. The studs are threaded at each end and are of such length that they can be bolted to connect the gear 23 either to the coupling 12, as in Fig. 4, or to the standard 26, as shown in Fig. 3. When the gear 23 is locked to the coupling 12, as shown in Fig. 4, by means of the stud or studs 27, when the shaft 3 revolves, the coupling 12 and the shaft 13 will be revolved at the same ratio, but when the stud or studs 27 are shifted to the position shown in Fig. 3, it will be seen that the internal gear 23 will be locked to the standard 26, and held from rotation. Consequently, when the pinion 10 revolves it carries the three pinions 11 around the now stationary internal gear 23. With the pinions 11 goes the coupling 12, and thereby the shaft 13 is driven at a lower speed. As herein shown the ratio is 4 to 1, that is, the shaft 3 will make four revolutions to one of the shaft 13, but of course this ratio can be varied by differently proportioning the pinions. Also, it will be seen that a step-up gearing will be provided in case the parts are reversed, making the shaft 13 the motor shaft and the shaft 3 the driving shaft.

From the foregoing description it will be seen that the brake and the driving shaft will always be positively connected irrespective of the position of the studs, and thereby the brake is always effective upon the winding drum. The studs are so constructed that they cannot be removed from between the standard 26 and the coupling 12, nor can the standard 26 be removed, even though it is unbolted from the base. This is an important feature, since if the studs could be removed there would be no assurance of safety, and the connection between the driving shaft and the motor shaft might be broken by carelessness of the workmen. The studs are simply shifted by removing the nuts and pushing them back in one or the other direction until they come through, and it will be seen that as soon as one stud is shifted in this manner the parts will be locked. For instance, by shifting the position of one stud shown in Fig. 4 to the position shown in Fig. 3 the internal gear 23 is locked to the standard 26, so that it is not possible to break the connection by failing to shift all the studs, nor is there any point at which the permanent connection is interrupted.

A further advantage of the invention is that the gearing is always in mesh, whether it is being used or not. At least three gears are engaged at the same time, and consequently the gears can be much smaller than they otherwise could if dependence were had upon the engagement of one pair of gears. It has heretofore been proposed to use ordinary back-gearing such as is used in lathes for reduction gearing in elevator machines, but such gearing has proven dangerous for use because it has to be set up in a special removable bearing when it is to be used, and in doing this it is necessary to uncouple the driving shaft from the motor shaft in order to install the reduction gearing. Then after this is put in it will be seen that by reason of the strain all coming on two pairs of teeth, such teeth have to be of heavier design than that disclosed in this application.

Modifications and changes may be made in the construction above described without departing from the scope of the invention.

Having thus described my invention, I declare that what I claim as new and desire to secure by Letters Patent is:—

1. The combination of a driving and a driven shaft, an internal gear, intermediate pinions and a driving pinion, and means for alternatively locking the internal gear to the driven shaft or holding the internal gear stationary, said locking means being permanently connected with said internal gear and adapted to lock either the driven shaft and said internal gear or a fixed abutment and said internal gear, and an abutment.

2. The combination of a driving shaft, a driven shaft, a planetary gear connection between said shafts adapted to vary the direct speed ratio between said shafts including shiftable means preventing complete disconnection at any time of the driving connection between said shafts.

3. The combination of a driving shaft, a driven shaft, longitudinally shiftable means and gears for coupling said shafts to rotate at the same speed, or at a different speed, said coupling means at all times maintaining a mechanical connection between said shafts.

4. The combination of a driving shaft, a driven shaft, a stationary abutment, a driving gearing between said shafts, and a shiftable coupling for locking said gearing to directly couple said shafts or for locking an element of said gearing and said abutment to effect a geared driving connection between said shafts.

5. The combination of a driving shaft, a driven shaft, a stationary abutment, a driving gearing between said shafts, and a shiftable coupling for locking said gearing to directly couple said shafts or for locking an element of said gearing and said abutment to effect a geared driving connection between said shafts, said coupling being at all times engaged either with said abutment and said element of the gearing, or with a plurality of elements of the gearing.

6. The combination of a driving shaft, a driven shaft, planetary gearing between said shafts, a shiftable stud for locking part of said planetary gearing to said driving shaft in one position, and a stationary abutment engaged by said stud in another position to lock a part of said gearing against rotation.

7. The combination of a driving shaft, a driven shaft, planetary gearing between said shafts, a longitudinally shiftable stud for locking part of said planetary gearing directly to said driving shaft, said stud being shiftable to lock a part of said planetary gearing against rotation, and being permanently carried by one element of said planetary gearing.

8. In elevator reduction gearing, a base, driving and motor shafts, reduction gearing between said shafts, locking means permanently carried by said reduction gearing and adapted to lock part of said gearing to the driving shaft or to the base according to the speed ratio to be secured between said shafts.

9. The combination of a shaft, an internal gear loosely and a pinion rigidly carried thereby, a second shaft, a planet pinion interposed between said internal gear and said first pinion, an abutment adjacent said internal gear, and a stud carried by said internal gear and longitudinally shiftable to engage it with said abutment or with said second shaft.

10. The combination of a shaft, an internal gear loosely mounted adjacent the end thereof, a pinion rigidly mounted at the end of said shaft, a second shaft, a collar rigidly carried at the end thereof, a planet pinion journaled on said collar and meshing with said first pinion and said internal gear, a stationary abutment adjacent said internal gear, and a stud shiftable to connect said internal gear and said abutment or said internal gear and said collar.

In testimony whereof I affix my signature, in presence of two witnesses.

EDWARD L. DUNN.

Witnesses:
J. ELMER HALL,
ALFRED H. SAMSON.

Copies of this patent may be obtained for five cents each, by addressing the "Commissioner of Patents Washington, D. C."